United States Patent
Quinn et al.

(10) Patent No.: US 8,481,635 B2
(45) Date of Patent: Jul. 9, 2013

(54) DISPOSABLE ARTICLE HOT MELT ADHESIVE

(75) Inventors: Thomas H. Quinn, St. Paul, MN (US); William L. Bunnelle, Ham Lake, MN (US)

(73) Assignee: Adherent Laboratories, Inc., St. Paul, MN (US)

( * ) Notice: Subject to any disclaimer, the term of this patent is extended or adjusted under 35 U.S.C. 154(b) by 589 days.

(21) Appl. No.: 12/445,975

(22) PCT Filed: Nov. 8, 2007

(86) PCT No.: PCT/US2007/084111
§ 371 (c)(1), (2), (4) Date: Aug. 16, 2010

(87) PCT Pub. No.: WO2008/063907
PCT Pub. Date: May 29, 2008

(65) Prior Publication Data
US 2010/0305528 A1    Dec. 2, 2010

Related U.S. Application Data

(60) Provisional application No. 60/858,565, filed on Nov. 13, 2006.

(51) Int. Cl.
*C08K 5/00* (2006.01)
*A61F 13/15* (2006.01)

(52) U.S. Cl.
USPC .......................................... 524/515; 604/359

(58) Field of Classification Search
USPC ...................................................... 524/515
See application file for complete search history.

(56) References Cited

U.S. PATENT DOCUMENTS

| | | |
|---|---|---|
| 4,358,564 A | 11/1982 | Ames |
| 4,719,260 A | 1/1988 | Stuart, Jr. et al. |
| 5,035,457 A | 7/1991 | Tveit et al. |
| 5,075,382 A | 12/1991 | Ohmae et al. |
| 5,367,022 A | 11/1994 | Kiang et al. |
| 5,378,758 A | 1/1995 | Amici et al. |
| 5,439,974 A | 8/1995 | Mattson |
| 5,589,122 A | 12/1996 | Leonard et al. |
| 5,660,922 A | 8/1997 | Herridge et al. |
| 5,763,516 A | 6/1998 | Godfrey |
| 6,084,029 A | 7/2000 | McGee |
| 6,319,353 B1 | 11/2001 | Mussig |
| 6,329,468 B1 | 12/2001 | Wang |
| 6,391,960 B1 | 5/2002 | Sambasivam et al. |
| 6,403,231 B1 | 6/2002 | Mueller et al. |
| 6,531,544 B1 | 3/2003 | Vaughan et al. |
| 6,582,762 B2 | 6/2003 | Faissat et al. |
| 6,753,053 B2 | 6/2004 | Futagawa et al. |
| 6,774,069 B2 | 8/2004 | Zhou et al. |
| 6,949,298 B2 | 9/2005 | Ikeda et al. |
| 2005/0014891 A1* | 1/2005 | Quinn ........................... 524/556 |
| 2005/0106385 A1* | 5/2005 | Martin et al. ................. 428/343 |
| 2006/0027320 A1 | 2/2006 | Kueppers et al. |
| 2007/0142801 A1 | 6/2007 | Zhou et al. |

FOREIGN PATENT DOCUMENTS

| | | |
|---|---|---|
| EP | 0803 559 | 10/1997 |
| WO | WO 2006/069687 | 7/2006 |

* cited by examiner

*Primary Examiner* — Hui Chin
(74) *Attorney, Agent, or Firm* — Pauly, Devries, Smith & Deffner, L.L.C.

(57) ABSTRACT

A hot melt adhesive comprises an ethylene α-olefin copolymer, an acid anhydride modified polyolefin and a hydrogenated tackifying resin. The hot melt adhesive has excellent viscoelastic properties and can be used in a variety of applications. In one application, attaching an elastic band to a flexible film, the adhesive has excellent viscosity and, in a finished absorbent article, a minimal creep characteristic. Also disclosed is a disposable article using the adhesive to adhere adjacent surfaces within the disposable article including an elastic band to a polyolefin backing film, for example, in a diaper, incontinent article or other such structure.

72 Claims, 5 Drawing Sheets

DISPOSABLE ARTICLE HOT MELT ADHESIVE

Figure 1:
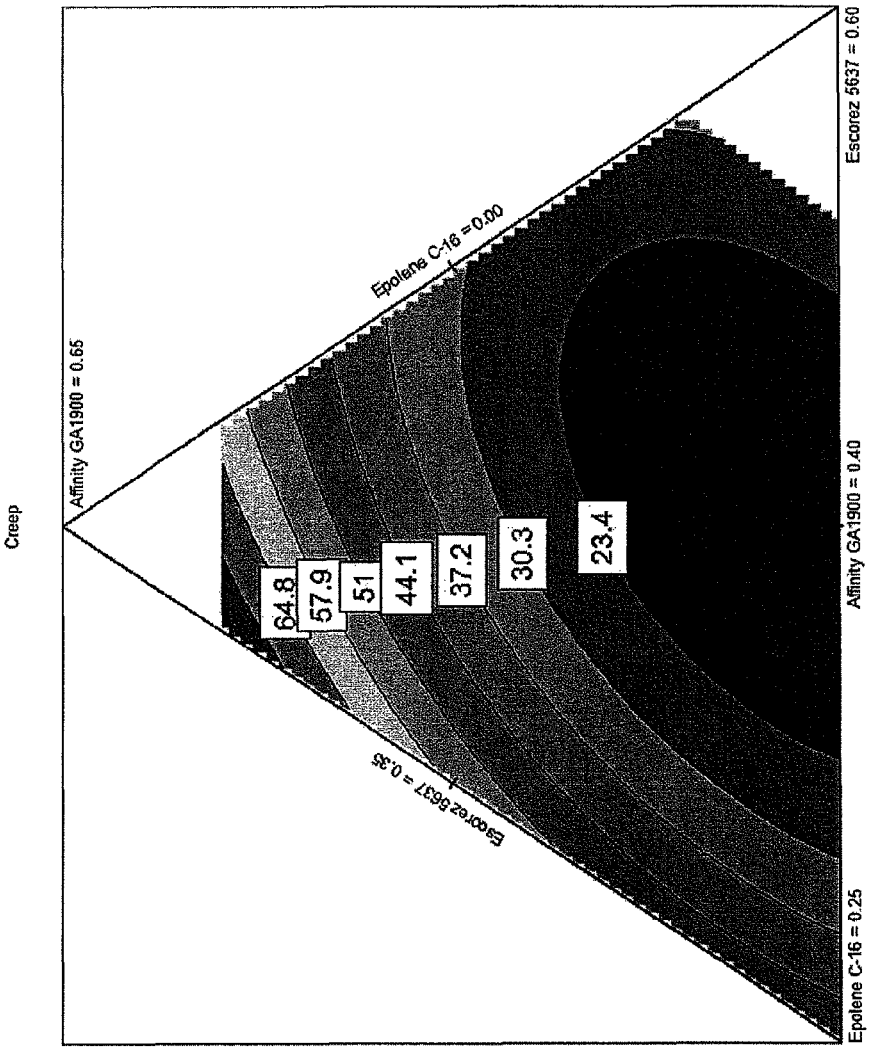

This application is being filed on 17 Apr. 2009, as a US National Stage of PCT International Patent application No. PCT/US2007/084111, filed 8 Nov. 2007 in the name of Adherent Laboratories, Inc., a U.S. national corporation, applicant for the designation of all countries except the US, and William L. Bunnelle and Thomas H. Quinn, citizens of the U.S., applicants for the designation of the US only, and claims priority to U.S. Provisional Patent Application Ser. No. 60/858,565, filed Nov. 13, 2006. To the extent appropriate, a claim of priority is made to each of the above disclosed applications.

FIELD OF THE INVENTION

The invention relates to hot melt adhesives that can be used in disposable articles. The adhesive can be used in a variety of applications including construction and elastic attachment. However, the preferred use of the adhesive is in elastic attachment using a spray-on adhesive method.

BACKGROUND OF THE INVENTION

Disposable articles are typically produced at high speed using automated machinery that combine polymer films, absorbent fiber, cover sheets and other components with adhesive materials at high speed resulting in useful articles. In such production, hot melt adhesives are typically extruded and applied at high speeds and at high temperatures (typically about 110° C. through about 280° C.) directly onto a nonwoven web, a polymer film, or another flexible component of the final disposable article object. Often a polymer film such as a polyester, polypropylene or polyethylene film is used with the hot adhesive. The film may be combined with an absorbent batt, a non-woven fabric, a tissue, a secondary film or anther fabric absorbent material, etc. using the hot melt adhesive.

Hot melt adhesives can be applied to the surface of the target layer with a variety of techniques including spray techniques or contact techniques such as multidot, multiline, etc. The spray techniques can form spray patterns and randomly oriented lines. Preferably, the hot melt adhesive is used for laminating layers of polymer, non-woven tissue, absorbent batting, cover layer, etc. into a final article. The adhesive can also be used in attaching an elastic material to a sheet-like substrate wherein during elastic attachment, substantial lamination of the structure can occur in a sophisticated assembly technique. In general purpose construction of disposable articles, the adhesive must be compatible with a wide variety of materials. The adhesive must be applied to a variety of substrates under a variety of conditions of time, temperature, add-on amount and manufacturing step. As such, a general purpose adhesive used for such construction must obtain a useful viscosity, typically 2000-8000 cP or 2000-16,000 cP, at the temperature at which the adhesive is applied to a substrate. Adhesive application temperatures are typically above about 120° C. and are typically in the range of 135°-210° C.

Elastic and/or elastic members are typically adhered to a substrate in a disposable article using hot melt application equipment. In the construction of disposable diapers, for example, the elastic is attached typically to the polyolefin substrate using hot melt spray-on equipment in which the adhesive is sprayed onto the polyolefin in a useful, typically overlapping circular pattern. The adhesive is used in an add-on amount from about 5 to about 30 $g \cdot m^{-2}$. The typical application temperature for the adhesives typically ranges from about 120° C. to about 210° C. Elastic members may be used to seal a leg opening, a waist opening or to obtain a useful contraction of the polyolefin film in other portions of the disposable article.

Typically, the elastic banding is stretched prior to or after contact with the polyolefin backing. Once the elastic banding is stretched and in place with the polyolefin, the adhesive is sprayed on, cooled and the elastic is permitted to relax, creating a gathered polyolefin sheet having substantial flexibility. After the banding is attached to the polyolefin sheet, the elastic can be stretched substantially up to 300% elongation before reaching the elastic limit.

In a preferred mode in attaching elastic materials to one or more substrates, the adhesive must exhibit high resistance to creep. In other words, the elastic material fixed in place by the adhesive, when placed under stress typical in either manufacture or use of the article, should not move substantially from its desired position on the surface of the material. Further, the elastic must not become partially or fully detached from its place of application.

Hot melt adhesives have been formulated for use in attaching elastic materials to one or more substrates. For example, Vaughan et al. (U.S. Pat. No. 6,531,544) disclose a hot melt adhesive suitable for bonding elastic to nonwoven, that further exhibits stress resistance in the presence of lotion on a surface. Zhou et al. (U.S. Pat. No. 6,774,069) disclose compositions of atactic polypropylene and isotactic polypropylene suitable for bonding non-woven elastic composites that exhibit improved bond strength compared to conventional hot melt adhesives. Sambasivam, et al. (U.S. Pat. No. 6,391,960) disclose a hot melt adhesive formulation that is an endblock resin combined with a radial or linear SBS copolymer suitable for use as a construction and elastic attachment adhesive in disposable products. Wang, et al. (U.S. Pat. No. 6,329,468) disclose a hot melt adhesive polyolefin formulation exhibiting good adhesion in elastic attachment applications with nonwoven disposable articles, having low melt viscosity, good heat stability, and oil resistance. Faissat, et al. (U.S. Pat. No. 6,582,762) disclose a polyolefin based hot melt adhesive particularly suitable for spraying applications. McGee et al. (U.S. Pat. No. 6,084,029) disclose a grafted polyolefin hot melt adhesive that does not employ a tackifier, and which exhibits good bonding properties to polar substrates.

Other adhesive formulations have been contemplated using polyolefins. For example, Ikeda, et al. (U.S. Pat. No. 6,949,298) disclose a thermoplastic resin composition comprising a styrene-hydrogenated diene block copolymer, and a second thermoplastic resin that is preferably a polyolefin, that has the desirable property of being capable of reacting with a boron-containing compound via residual unsaturation of the diene copolymer.

Other adhesive applications of polyolefin-based materials include the disclosure in Futugawa, et al. (U.S. Pat. No. 6,753,053) of a laminated film wherein a polyolefin provides adhesion between layers of the film using a coextrusion inflation method. Mueller, et al. (U.S. Pat. No. 6,403,231) disclose a nanocomposite laminated multilayer sheet that is thermoformed e.g. using extrusion techniques, where one or more layers comprise a polyolefin that provides adhesion between layers of the sheet.

Polyolefin compositions modified with maleic acid groups are also known. The technique of grafting maleic anhydride onto polyethylene and polypropylene was initially disclosed by Ames (U.S. Pat. No. 4,358,564).

Further, Mussig (U.S. Pat. No. 6,319,353) discloses a pressure sensitive composition comprising a maleic acid anhydride modified polyolefin copolymer. Godfrey (U.S. Pat. No. 5,763,516) discloses a polyolefin grafted with maleic anhydride as one component of a hot melt adhesive, along with a wax. Herridge, et al. (U.S. Pat. No. 5,660,922) and Leonard et al. (U.S. Pat. No. 5,589,122) disclose a pressure sensitive adhesive layered construction that can employ a maleic anhydride modified polyolefin as a layer disposed between a backing and the pressure sensitive adhesive layer. Mattson (U.S. Pat. No. 5,439,974) discloses an adhesive that employs a polypropylene polymer and a grafted ethylenically unsaturated carboxylic acid or derivative grafting monomer such as maleic anhydride. Amici et al. (U.S. Pat. No. 5,378,758) discloses a hot melt adhesive composition that may employ a copolymer of, among other monomers, propylene and maleic anhydride as one component of the formulation. Kiang et al. (U.S. Pat. No. 5,367,022) disclose a maleic anhydride grafted polypropylene that is useful in an adhesive composition. Ohmae et al. (U.S. Pat. No. 5,075,382) disclose an adhesive composition employing a blend of an ethylene/(meth)acrylic acid ester/maleic anhydride copolymer with a silane-modified ethylene copolymer. Lee (U.S. Pat. No. 5,035,457) discloses a low melt index, tackifier-free polyethylene grafted with maleic anhydride that is part of an extrudable adhesive formulation. And Stuart et al. (U.S. Pat. No. 4,719,260) disclose a polypropylene based hot melt adhesive formulation wherein the tackifier resin is maleated.

Currently, the commercially implemented adhesives for elastic attachment in diaper manufacture are sold by H.B. Fuller Company and Bostik under the product names HL-1484 and H-2525-A, respectively. In large part, these construction and elastic attachment adhesives are made from styrene isoprene styrene or styrene butadiene styrene ABA block copolymers combined with plasticizers, extending oils, tackifiers, fillers and other components to form a useful locus adhesive.

We have found in our work that currently available adhesives are not optimal in one or more properties including open time, viscosity at application temperature, or resistance to creep. Accordingly, a substantial need exists for adhesive compositions having improved open time, viscosity at application temperature, and creep resistance; similarly, a need exists for improved disposable article constructions employing such an improved adhesive.

BRIEF DISCUSSION OF THE INVENTION

The invention relates to a hot melt adhesive used for manufacturing disposable articles. The adhesive can comprise an ethylene α-olefin polymer, a diacid or maleic anhydride substituted polyethylene and a hydrogenated tackifying polymer. The adhesive can be used in general construction applications but is preferred for elastic attachment applications.

The invention is directed to a hot melt adhesive composition having a Brookfield viscosity between about 2000 to about 16,000 cP using a No. SC4-27 spindle at 150° C. and a percent creep under end use conditions of about 10% to about 25%. The adhesive formulations of the invention include at least an ethylene α-olefin copolymer having about 30 to about 65 wt % of the α-olefin comonomer, a polyethylene having randomly distributed diacid anhydride substituent wherein the saponification number of the polymer generally ranges from about 0.05 to about 15, and a hydrogenated tackifying resin. We have found that the combination of these ingredients provides a useful hot melt adhesive that has a low application viscosity at useful application temperatures and superior resistance to creep. This combination of properties is surprising in light of the low molecular weight of the ethylene α-olefin copolymer and its percentage relative to the amounts of the other components in the composition.

BRIEF DISCUSSION OF THE FIGURES

FIG. 1 is a ternary plot of mixtures of ethylene α-olefin copolymer, tackifying resin, and maleic anhydride substituted polyethylenes, showing variation in creep at ambient temperature as a function of variation the amounts of three components in an adhesive blend of the invention. Tackifying resin Escorez® 5637 (available from the ExxonMobil Chemical Company of Houston, Tex.) is varied between 0.35-0.60 parts; maleated polyethylene Epolene® C-16 (available from the Eastman Chemical Company of Kingsport, Tenn.), is varied from 0 to 0.25 parts; and ethylene alpha-olefin polymer Affinity® GA-1900 (available from the Dow Chemical Company of Midland, Mich.), is varied from 0.40-0.65 parts. The diagram shows that the creep varies from about 20% to about 70% over the range of variables; however, a creep of less than 30% is generally acceptable, while a creep of less than 25% is preferred.

Figure 2:
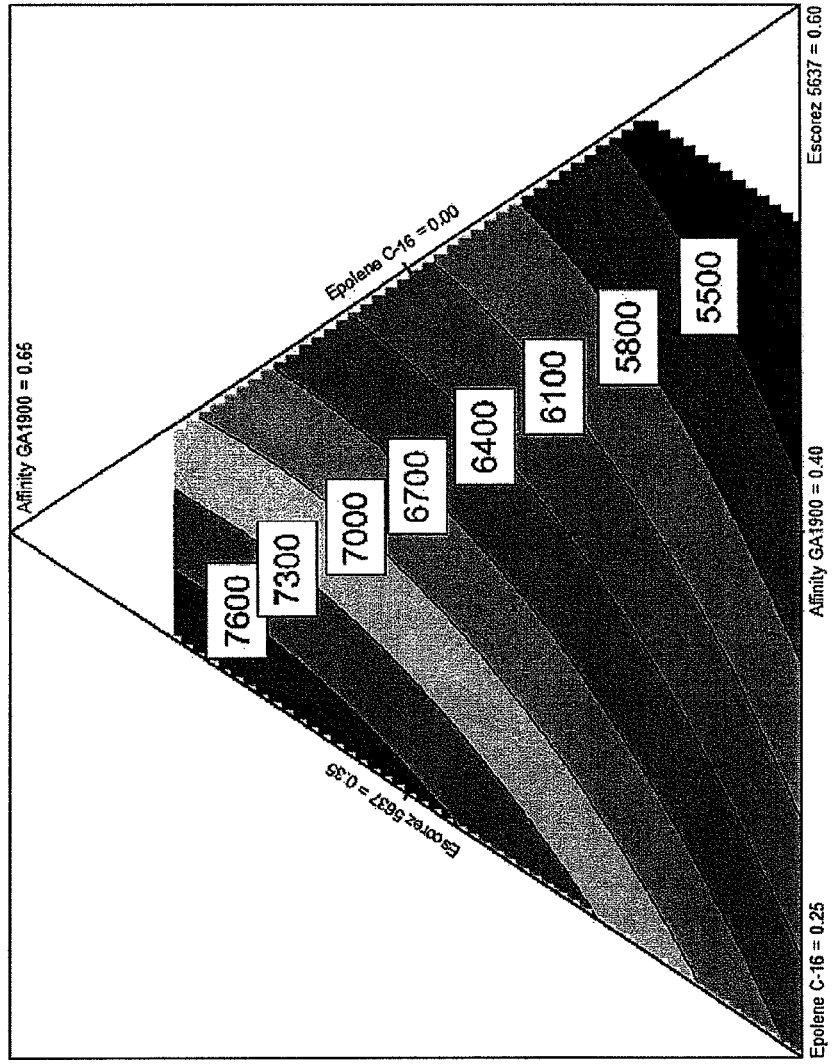

FIG. 2 is a ternary diagram of the measurement of Brookfield viscosity at 150° C. for the adhesives of the invention, showing variation in viscosity as a function of varying the amounts of three components in an adhesive blend of the invention. Tackifying resin Escorez® 5637 (available from the ExxonMobil Chemical Company of Houston, Tex.), is varied between 0.35-0.60 parts; maleated polyethylene Epolene® C-16 (available from the Eastman Chemical Company of Kingsport, Tenn.), is varied from 0 to 0.25 parts; and ethylene alpha-olefin polymer Affinity® GA-1900 (available from the Dow Chemical Company of Midland, Mich.), is varied from 0.40-0.65 parts. Brookfield viscosities ranged from about 5000 to about 8000 cP at 150° C. Lower viscosity is preferable; however, any viscosity less than 16,000 cP is acceptable.

Figure 3:
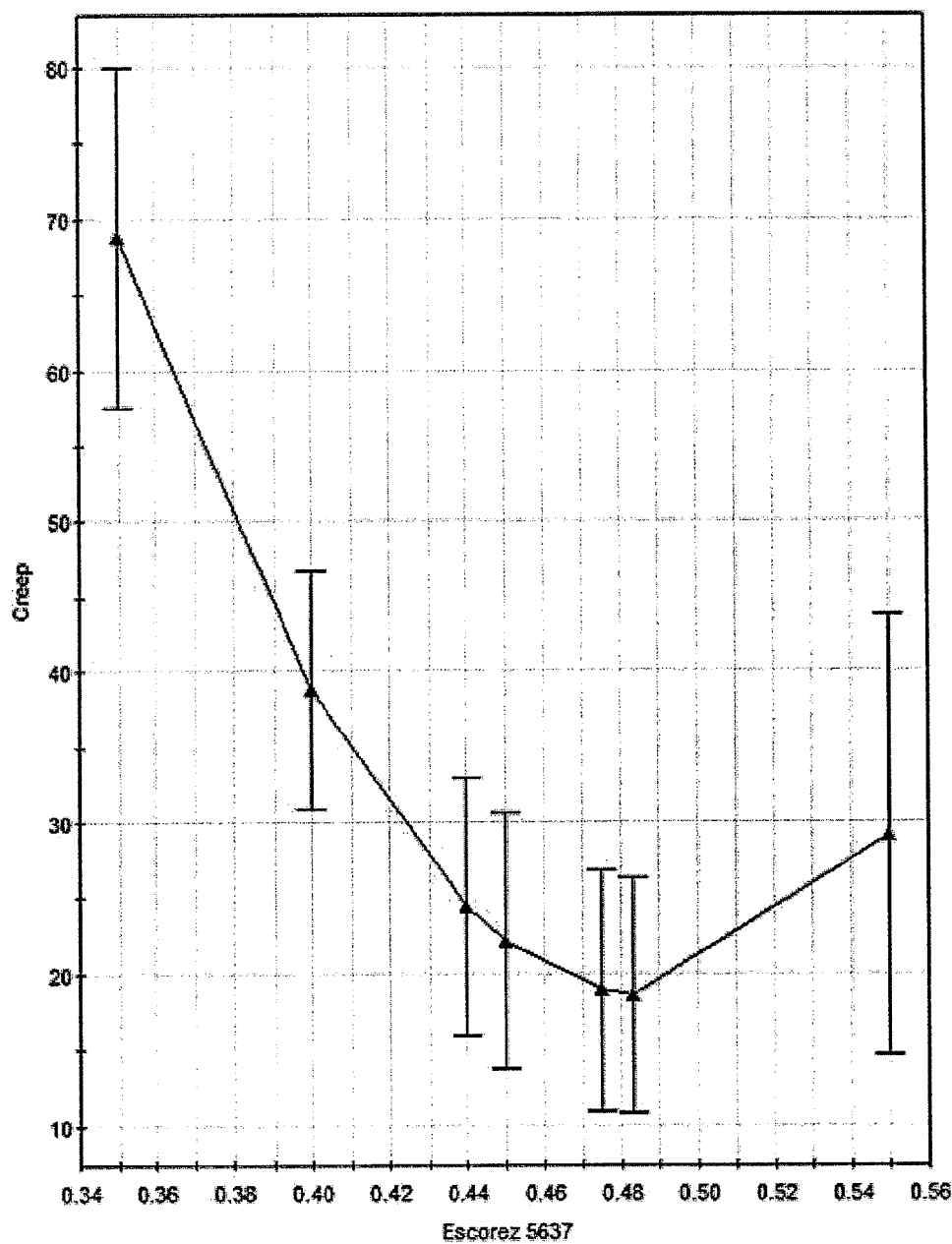

FIG. 3 shows the effect of varying the concentration of the tackifying resin Escorez® 5637 while keeping the ratio of Affinity® GA 1900 to Epolene® C-16 constant at a ratio of 7:1. FIG. 3a shows that the viscosity at 150° C. continues to decrease with increasing Escorez® 5637 content. FIG. 3b shows that the creep value passes through a minimum at just above 0.48 wt % Escorez® 5637.

Figure 4:
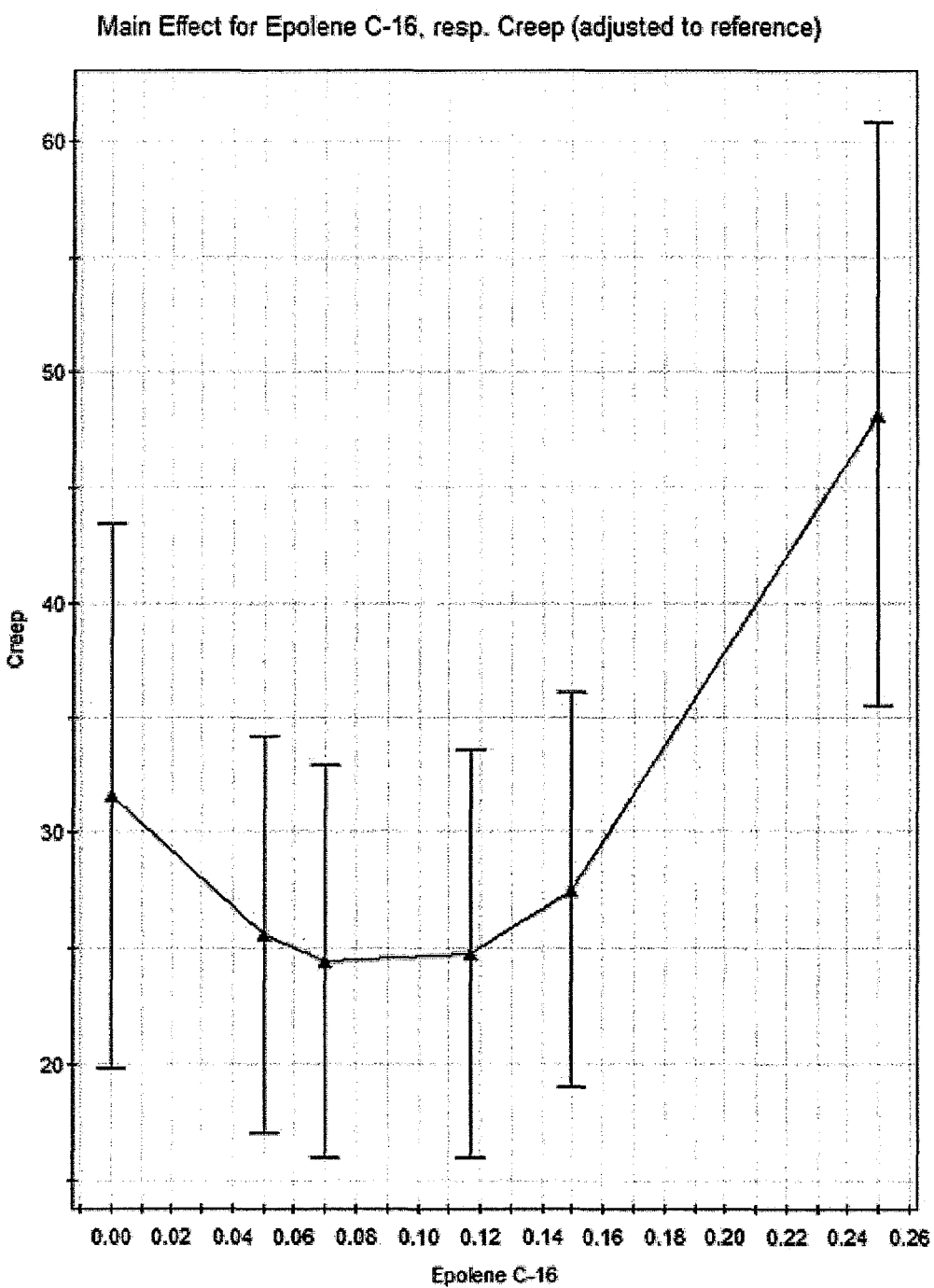

FIG. 4 shows the effect of varying the concentration of the maleated polyethylene Epolene® C-16, while holding the ratio of and Affinity® GA 1900 and Escorez® 5637 constant at 1.1:1. FIG. 4a shows that the viscosity at 150° C. reaches a maximum at about 0.15 wt % Epolene® C-16 content. FIG. 4b shows that the creep value passes through a minimum between 0.07 and 0.12 wt % Epolene® C-16.

Figure 5:
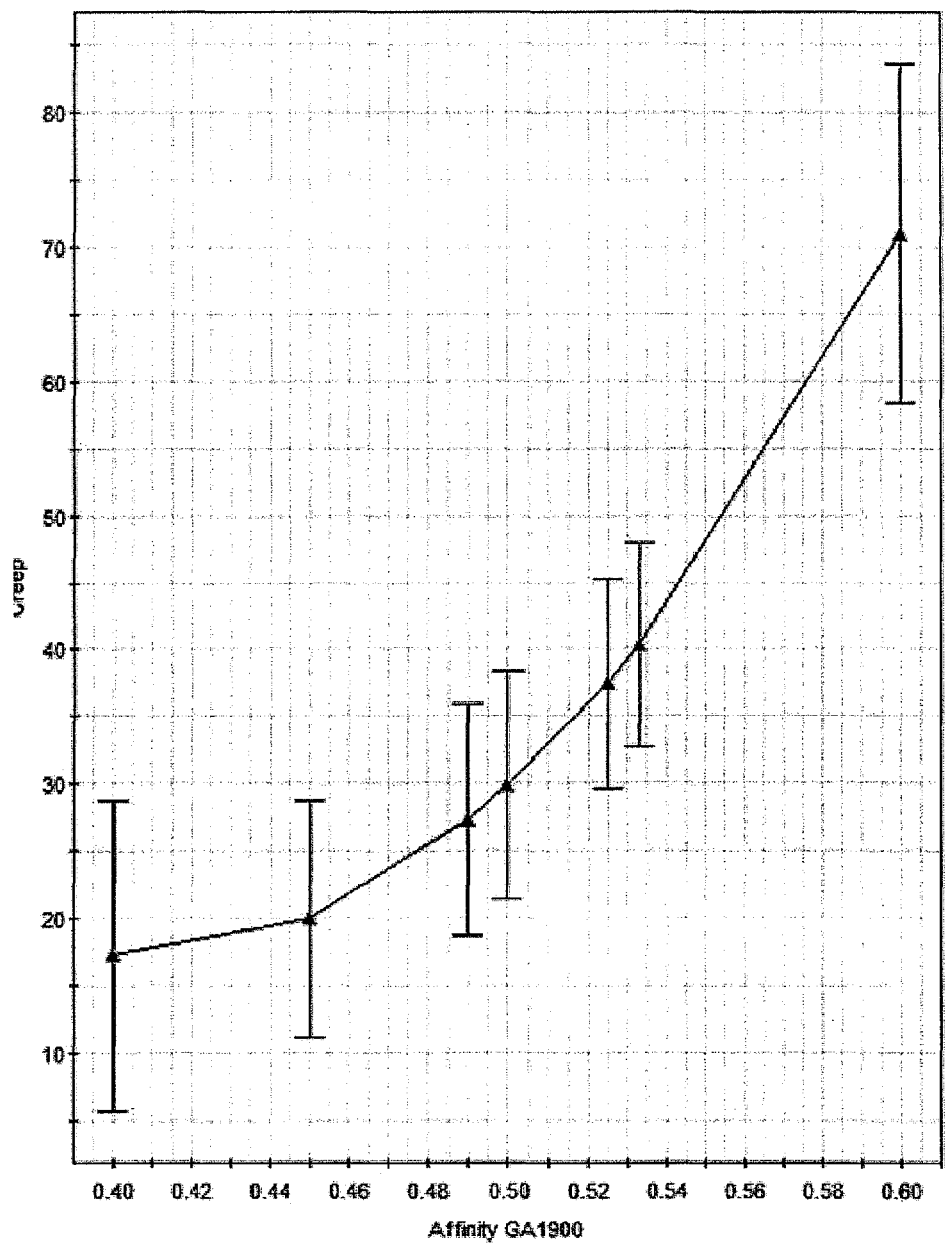

FIG. 5 shows the effect of varying the concentration of the ethylene-alpha olefin copolymer Affinity® GA-1900, while holding the ratio of Escorez® 5637 to Epolene® C-16 constant at 6.3:1. FIG. 5a shows that the viscosity continues to increase with increasing Affinity® GA-1900 content. FIG. 5b shows that the creep also continues to increase with increasing Affinity® GA-1900 content.

DETAILED DISCUSSION OF THE INVENTION

The adhesive composition of the invention comprises at least one homogeneous ethylene α-olefin polymer which contains ethylene and at least one $C_3$ to $C_{16}$ α-olefin. Such ethylene α-olefin polymers are selected based on homogeneity, density and molecular weight ($M_n$). Useful ethylene α-olefin polymers are characterized as having a narrow molecular weight distribution, less than 4, preferably less than 3, more preferably from 1 to 3, even more preferably from 1.25 to 2.5. The polymers are typically homogenous and random copolymers. Any monomer is randomly distributed within a given molecule and substantially all of the polymer molecules have the same ethylene/comonomer content. The homogeneous ethylene/α-olefin polymer comprises ethylene and at least one α-olefin monomer selected from the group consisting of an α-olefin, non-conjugated diene, and a cycloalkene; thus, useful α-olefin monomers include propylene, isobutylene, 1-butene, 1-hexene, 4-methyl-1-pentene, 1-heptene, and 1-octene, cyclopentene, cyclohexene and cyclooctene, 1,4-hexadiene; 1,5-heptadiene; 4-vinyl cyclohexene; 1-allyl-4-isopropylidene cyclohexane; 3-allyl cyclopentene; 4-allyl cyclohexene; and 1-isopropenyl-4-butenylcyclohexene; dicyclopentadiene; alkenyl, alkylidene, cycloalkenyl, and cycloalkylidene norbornenes, such as 5-methylene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene; 5-ethylidene-2-norbornene; 5-cyclohexylidene-2-norbornene; piperylene.

The molecular weight of the useful α-olefin copolymer will be selected on the basis of the desired performance attributes of the adhesive formulation and can have a number average molecular weight of at least 800 g-mol$^{-1}$, preferably at least 1,300 and no more than 100,000 g-mol$^{-1}$. Ultra low molecular weight homogeneous ethylene α-olefin polymer are considered to have a number average molecular weight of less than about 11,000 g-mol$^{-1}$. For adhesive applications, the homogeneous ethylene/α-olefin polymer typically has a melt index greater than about 800 g-10 min$^{-1}$, more typically greater than about 900 g-10 min$^{-1}$, preferably greater than about 950 g-10 min$^{-1}$. The melt index inversely relates to the molten viscosity. The density of the ethylene α-olefin polymer will be selected on the basis of the desired performance attributes of the adhesive formulation. Typically however, the homogeneous ethylene/α-olefin polymer will have a density of at least 0.850 g-cm$^{-3}$, preferably at least 0.860 to 0.900 g-cm$^{-3}$, and more preferably about 0.860 to 0.890 g-cm$^{-3}$.

The percent of crystalline content at ambient temperature of the useful α-olefin copolymer will be selected based on the desired performance attributes of the adhesive formulation and may have a crystalline content of at least 5 to about 50 wt % based on the weight of polymer, more preferably about 10 to about 30 wt %, and most preferably about 15 to about 20 wt %.

The preferred polyethylene α-olefin polymer comprises Affinity® GA polyolefin elastomer manufactured by Dow Chemical Company of Midland, Mich. These materials have unique properties that cooperate with the maleic anhydride substituted polyethylene to form a low viscosity adhesive that surprisingly has excellent resistance to sheer. The typical properties of the preferred polymers are as shown in Table 1.

TABLE 1

Physical properties of Affinity ® GA polymers

| Polymer | AFFINITY ® GA 1900 POP | AFFINITY ® GA 1950 POP |
|---|---|---|
| Density, g-cc | 0.870 | 0.874 |
| Brookfield Viscosity @ 350° F. (177° C.), cps | 8,200 | 17,000 |
| Approximate Melt Index, g-10 min$^{-1}$ (190° C., 2.16 kg weight) | 1,000 | 500 |
| DSC Melting Point, ° F. (° C.) | 154 (68) | 158 (70) |
| Crystallinity, %[1] | 15.8 | 18.3 |

TABLE 1-continued

Physical properties of Affinity ® GA polymers

| Polymer | AFFINITY ® GA 1900 POP | AFFINITY ® GA 1950 POP |
|---|---|---|
| Glass Transition Temperature, ° F. (° C.) | −72 (−58) | −69 (−57) |

[1][(Heat of Fusion in J/g)/(292 J/g)] · 100.

The homogeneous ethylene α-olefin polymer will typically be present as a single polymer or polymer mixture in the adhesive of the invention in an amount greater than about 30 wt %, preferably greater than about 40 wt %, and more preferably greater than about 50 wt %. When employing two or more homogeneous ethylene α-olefin polymer, the first and second polymer will differ from each other with respect to the type of monomer or the molecular weight or melt index, or the density, or the molecular weight distribution. Accordingly, the first and second polymer may differ in number average molecular weight by at least 5000, preferably at least 10,000, and more preferably at least 20,000. In addition or in the alternative, the first and second polymers may differ in density by at least 0.005 g-cm$^{-3}$, preferably by at least 0.01 g-cm$^{-3}$.

The adhesive can employ between about 0.1 and 50 wt % of a second polymer for purposes such as to inhibit crystallization, increase cohesive strength in the adhesive, and increase peel strength after application. Polymers useful include ABA block polymer structures, AB diblock structures, and (A-B)$_n$ radial block polymers, as well as branched and grafted materials. The B block is typically propylene, isoprene, butadiene, hydrogenated butadiene, hydrogenated isoprene, etc.

Commercially available materials that are suitable second polymers include the Kraton® block polymer materials, (Shell Chemical Company, Houston, Tex.), Septon® (SEEPS) materials for Kuraray Co., Ltd., Europrene® block polymer
[(Heat of Fusion in J/g)/(292 J/g)]·100. materials, Sol T polymer materials (EniChem, Houston, Tex.), Vector® block polymer materials (Exxon/Dexco, Houston, Tex.). The A block (ethylene, styrene or other vinyl monomer) content of the polymer ranges from 0.1 wt % to about 50 wt %. Typically, the aromatic A block concentration ranges from about 5 wt % to about 45 wt % based on the polymer. The styrene content can be less than about 25 wt %, more preferably less than about 20 wt % and most preferably from about 5 wt % to about 15 wt % styrene with respect to the total weight of the block copolymer for certain formulations.

When employed with a ethylene/α-olefin polymer having a relatively high melt index, the second polymer is a block copolymer that preferably comprises a hydrogenated block copolymer. For this embodiment the block copolymer contributes significantly to the cohesive strength of the adhesive composition. The molecular weight of a block copolymer relates to its solution viscosity at 25° C., for a given weight of polymer in (toluene) solvent. The amount of block copolymer employed for determining the solution viscosity depends on the molecular weight. The block polymer is substantially hydrogenated in which the midblock is typically ethylene/butylene, ethylene/propylene, or mixtures thereof. Preferred block copolymers comprise substantially saturated materials having styrene endblocks and ethylene/butylene or ethylene/propylene midblocks and having a di-block content of less than about 70%, a di-block content of preferably less than about 50% and more preferably less than about 30%. The block copolymers useful herein preferably have a melt index of greater than about 20 g-10 min$^{-1}$, more preferably greater than about 30 g-10 min$^{-1}$, even more preferably greater than about 50 g-10 min$^{-1}$ and most preferably greater than about 60 g-10 min$^{-1}$. The styrene content is preferably from about 10% to about 40% by weight of the block copolymer, more preferably from about 10% to about 35% by weight and most preferably from about 10% to about 30% by weight of the block copolymer.

Other preferred second polymers include styrene-ethylene/propylene-styrene (hereinafter SEEPS) block copolymers (available from Kuraray Company, Ltd in Tokyo, Japan under the tradename of Septon®) and may be utilized providing the block copolymer meets the diblock requirement. These block copolymers are useful from about 5 wt % to about 30 wt % of the adhesive. Kraton® G-1650 (available from Kraton Polymers U.S. LLC of Houston, Tex.), a linear styrene-ethylene/butylene-styrene block copolymer having a diblock content of 0%, an $M_n$ of about 113,000 and a styrene content of about 28% is one example of a useful second polymer. Also useful is Septon® 4033 (supplied by Kuraray, Japan), a linear styrene-ethylene/propylene-styrene block copolymer having a diblock content of 0%, an $M_n$ of about 108,000 and a styrene content of about 30% by weight of the copolymer. The midblocks are preferably ethylene/butylene, ethylene/propylene or isoprene and are more preferably ethylene/butylene or ethylene/propylene. The styrene content is preferably between about 10% and about 40% by weight of the block copolymer, more preferably from about 10% to about 35% by weight, even more preferably from about 10% to about 30% by weight and most preferably from about 10% to about 25% by weight. The melt index of these block copolymers is preferably greater than about 5 g-10 min$^{-1}$ and more preferably greater than about 10 g-10 min$^{-1}$.

Other examples of useful second polymers include Kraton® 1652, a 100% linear SEBS block copolymer having about 29% styrene and a melt index of about 10 g-10 min$^{-1}$. These block copolymers are useful from about 5 wt % to about 50 wt % of the adhesive, preferably from about 10 wt % to about 50 wt % of the adhesive and more preferably from about 10 wt % to about 40 wt % of the adhesive.

One component of the invention comprises a chemically modified polyethylene. The polyethylene is chemically modified by forming pendent diacid anhydride groups randomly on the polyethylene backbone. The polymers are manufactured by taking a polyethylene material such as Epolene® C-10 or Epolene® C-15 (available from the Eastman Chemical Company of Kingsport, Tenn.), for example, and grafting a diacid anhydride group such as maleic anhydride under typically free radical conditions directly on the backbone of the polymer material. Other reaction schemes can be used. For example, monomer with preformed anhydride groups can be used in the polymer manufacture.

Preferable chemically modified polyethylene materials are maleic anhydride modified substituted polyethylenes. The polymers typically have a molecular weight greater than about 2000 and typically range from about 3000 to about 10,000. The degree of substitution of the maleic anhydride groups on the polymer is generally reflected in the saponification number that ranges from about 0.05 to about 15, preferably about 2 to about 10. The density of the materials typically ranges from about 0.900 to about 0.915. Preferred materials include Epolene® C-16 and C-18 (available from the Eastman Chemical Company of Kingsport, Tenn.). The physical properties of these maleic anhydride modified polyethylenes are shown in Table 2. Epolene® C-16 and C-18 are maleic acid grafted polyethylenes with approximate molecular weights of 8000 and 4000, respectively. Maleated ethylene-propylene elastomers also are useful, such as maleated elastomers sold by the ExxonMobile Chemical Company of Houston, Tex. under the trade name Exxelor®.

TABLE 2

Physical properties[1] of Epolene® C-16 and C-18 polymers

|  | Epolene® C-16 | Epolene® C-18 |
|---|---|---|
| Ring and Ball Softening Point, ° C. | 102 | 101 |
| Penetration Hardness, 100 grams for 5 sec at 25° C. | 0.3 | 0.4 |
| Density, 25° C., g-cm$^{-3}$ | 0.908 | 0.905 |
| Saponification Number | 5.0 | 5.0 |
| Brookfield Thermosel Viscosity, cP | | |
| @ 125° C. (257° F.) | 16,650 | 7,750 |
| @ 150° C. (302° F.) | 8,100 | 4,100 |
| @ 190° C. (374° F.) | 2,850 | 1,550 |
| Color, Gardner Scale | 1 | 1 |
| Molecular Weight, $M_n$ | 5,600 | 5,700 |
| Cloud Point, ° C.[2] | 78 | 71 |
| Flash Point, ° C., COC | 302 | 302 |

[1]Properties reported here are typical of average lots. Eastman Chemical Company makes no representation that the material in any particular shipment will conform to the listed values.
[2]2% by weight in 54° C. paraffin.

The preferred tackifying resins for use in the adhesives of this invention have a softening point that is greater than about 120° C., preferably greater than 125° C., wherein the typical and most useful materials have a softening point that ranges from about 127° C. to about 145° C. A preferred class of tackifying resins include the petroleum hydrocarbon resins that are very light in color, aromatic modified, cycloaliphatic hydrocarbon resins. These materials are often hydrogenated to improve thermal stability and are typically made by first polymerizing aliphatic materials into an amorphous polymer composition which can then be post modified with aromatic components, hydrogenation, etc. to form a high melting tackifying material that is particularly effective in the adhesive materials of the invention. The polymer or polymer blends of the invention are combined with tackifying agent in an amount that ranges from about 30 to 80 wt % of the tackifying resin, often 45 to 75 wt % of the tackifying resin and in many embodiments of the invention about 50 to 65 wt % of the tackifying resin. In such compositions, ethylene α-olefin copolymer is typically present in an amount of greater than about 30 wt % up to 65 wt % of the polymer or polymer blend, often 40 to 60 wt % and often 40 to 55 wt % of the adhesive. The maleic anhydride polymer is typically present in an amount of greater than about 0.05 wt % up to 30 wt % of the polymer or polymer blend, often 0.1 wt % to 28 wt % and often 5 wt % to 25 wt % of the adhesive.

In this application, the preferred tackifier resins are Escorez® resins manufactured by ExxonMobil Chemical Company of Houston, Tex., and the most preferable Escorez® for the blends of the current invention is Escorez® 5637. The properties of several Escorez® tackifiers are shown in Table 3.

TABLE 3

Physical properties of Escorez® tackifiers

| | Escorez Grades | | | |
|---|---|---|---|---|
| Physical Properties | 5600 | 5615 | 5637 | 5690 |
| Softening Point, R & B, ° C. | 100 to 106 | 115 to 121 | 127 to 133 | 87 to 93 |
| Color | | | | |
| YI, Initial Color[1] | 6 max. | 7 max. | 7 max. | 7 max. |
| YI, Aged 5 hours at | 75 max. | 75 max. | 61 max. | 77 max. |

TABLE 3-continued

Physical properties of Escorez ® tackifiers

| Physical Properties | Escorez Grades | | | |
|---|---|---|---|---|
| | 5600 | 5615 | 5637 | 5690 |
| 175° C.[1] Aromaticity, % | 8 to 11 | 8 to 11 | — | 9.5 to 12 |
| Appearance | Clear, Free of Foreign Matter | | | |
| Melt Viscosity (Brookfield) | 140 | 160 | 180 | 130 |
| Test Temperature, ° C. cP | 4300 | 3000 | 1800 | 3000 |
| Molecular Weight | | | | |
| Mw | 520 | 560 | 500 | 480 |
| Mn | 270 | 310 | 300 | 250 |
| Mz | 950 | 1000 | 910 | 900 |
| Tg, ° C. | 48 | 65 | 80 | 45 |
| Specific Gravity, 10-20° C. (IPOH) | 1.1 | 1.1 | 1.1 | 1.1 |
| Ash Content, wt % | <0.1 | <0.1 | <0.1 | <0.1 |
| Acid Number, mg KOH-g | <1 | <1 | <1 | <1 |

[1]Solution color as determined by measurement of a 50% (by weight) product in toluene mixture.
[2]ExxonMobil Test Methods, some of which were developed from ASTM test methods, are available upon request.

The composition of the present invention may be applied by any generally known hot melt application technique, such as slot coating, spiral spraying, screen printing, foaming, engraved roller or melt blown adhesive application techniques. When applied in this manner, the inventive thermoplastic composition may be present as a coating, fiber, non-woven web, or film layer on at least one substrate or as a portion of an article.

In one embodiment of the disposable article of the invention comprises at least one film combined with a non-woven or woven fabric having a bonding layer of the adhesive of the material. The bonding layer can typically comprise a uniform layer, a spiral spray, a stripe coated, or a sprayed on or a fine line application of adhesive composition. The amount of adhesive combined with the film and the fabric comprises about 5 to about 30 g-m$^{-2}$ depending on the means of application of the adhesive. The adhesive typically is combined with the film or fabric by delivering the materials at an adhesive melt application temperature to effectively bond the film to fabric.

The articles of the invention at a minimum comprise a film layer or a permeable layer adhesively joined with an elastic. The article can also include a permeable layer comprising a cellulosic tissue, a woven or non-woven fabric or other thin, flexible, porous or wettable sheet-like material. The tissue layer is a well known, typically loosely formed cellulosic sheet of high porosity or permeability. The fabric layer consists of a fluid permeable flexible material that can be made of either hydrophilic or hydrophobic fiber components. Woven and non-woven webs comprising the fabric can comprise natural or synthetic fibers or mixtures thereof. Woven and non-woven materials are well known and their construction methods have been practiced for many years. Woven fabrics are typically manufactured in weaving machines forming an interlocking mesh of fibers forming the layer. Non-woven fabrics can be made through a dry-laid or wet-laid method in carding processes, air laying processes or spunbond processes to produce a web that is mechanically, chemically or thermally formed. The fabric layers for use in the compounds and articles of this invention typically have a basis weight in the range of about 10 g-yd$^{-2}$ to 25 g-yd$^{-2}$, preferably 14 g-yd$^{-2}$ to 18 g-yd$^{-2}$, a minimum dry tensile strength of at least 800 g-cm$^{-2}$ in the machine direction, and at least 200 g-cm$^{-2}$ in across machine direction. Synthetic materials commonly used in forming the fabric top sheets include rayon, polyester, polypropylene, polyethylene, nylon and others.

The film or sheet-like layer used in the invention comprises a flexible sheet-like or film substrate. Such films are typically manufactured from thermoplastic resins and take the form of a thin layer having a thickness of about 0.5 to 2.0 mils. Such films comprise polyethylene, polypropylene, ethylene-propylene copolymers, ethylene acrylate copolymers, ethylene vinyl acetate copolymers, polyvinyl chloride polymers, polyvinylidene chloride polymers, polyester polymers and others. Such films can be perforate or imperforate. In addition to the above materials used in the composite articles of the invention, a variety of other materials can be used, including other wrapping materials, absorbent materials, deodorants, perfumes, dyes, and decorative appliqués, which provide further absorbency, instructional legends, and pleasing appearance or smells.

The substrate materials that can be used in the manufacture of the disposable articles of the invention, in combination with the tissue or woven or non-woven fabric, comprise any typical substrate used in the manufacture of disposable articles including films, sheets, elastics, absorbents, cellulosic fluffs or fill, other tissue, woven or non-woven fabrics, etc.

Absorbent layers can be adhered to other substrates using the adhesives of the invention. Such absorbent layers can comprise cellulosic pulp or fluff. Such fluff layers are often formed and wrapped in tissue to provide mechanical integrity to the fluff which has little inherent integrity. Fluff is typically manufactured through formation of cellulosic fibers. However, other materials can be utilized to form high absorbent fluff or pulp layers.

Absorbent layers that may be used in the manufacture of the disposable articles of the invention may also include "superabsorbents", which are synthetic resin compositions designed to absorb large quantities of aqueous liquids. Such compositions typically comprise a water-insoluble (e.g. crosslinked) organic anionic polymer material in small particulate form that can absorb at least 50 wt % of water based on their starting weight.

Elastic bands or elements can be used in the manufacture of the disposable articles of this invention.

In somewhat greater detail, the adhesives of the invention can be used in the manufacture of disposable articles including disposable diapers, incontinent devices or diapers, and disposable bed pads by adhering a stretched elastic to a film substrate. In the manufacture of absorbents for diaper and incontinent disposables, it is common to wrap loosely assembled fluff or batts of absorbent material within a tissue overwrap. In such manufacture, the tissue surrounds the absorbent material in an overlapping fashion such that the spray-on adhesive can be applied to the overlap area, causing the adhesive to penetrate the overlap to contact the underlying fluff or batt. The spray-on adhesive in contact with the tissue and absorbent material forms a strong mechanical bond which maintains the tissue wrap and provides mechanical support and integrity to the underlying fluff or absorbent batt material. As a result of using the manufacturing techniques of the invention, the tissue covered absorbent material obtains substantial mechanical integrity from the adhesive and tissue structure. During use, the tissue and adhesive maintains the fluff or batt in place and prevents movement of the absorbent material resulting in an inappropriate segregation of absorbent material in a small portion of the absorbent article. Such mechanical integrity insures that the absorbent material stays in place to provide absorbency and protection.

In the manufacture of composite articles, the fluid permeable fabric top sheet is adhered to a film back sheet. An absorbent layer can be introduced into the space between the fabric layer and the back sheet. Typically a fluid in contact with the fabric layer passes through the fabric layer and is absorbed and held within the absorbent layer. The absorbent core typically comprises a highly porous, highly absorbent loosely contacted fluff, wrapped or encased within a tissue cover. The absorbent fluff typically has little mechanical integrity. The tissue wrap or cover, once adhered to the fluff, provides the absorbent layer with substantial dimensional integrity preventing the absorbent material from migrating or collecting in an inappropriate portion of the composite article. The tissue wrap ensures that the absorbent material remains evenly distributed within the envelope created by the back sheet and the fabric layer. The manufactured diaper or the components of the diaper can have elastic bands or segments adhesively attached to provide security for the wearer. Such elastic bands create a snug fit at the waist and the leg apertures of the disposable articles.

The adhesive compositions of the invention can be used to form bonds between the surfaces of the film materials between apertured films and non-apertured films, between tissue and non-woven or woven fabric layers, between absorbent fluff and tissue overwraps, and between elastic bands or elements and any structural component of the disposable diaper.

In construction methods for adhering an elastic to a film in the disposable articles of the invention, the adhesives are typically applied from spray heads that deliver the adhesive at elevated temperatures. Temperatures of the spray heads are generally above about 120° C. and are more typically in the range of 135° C. to 210° C. The spray heads have apertures that range from about 0.025 cm to about 0.10 cm. Under the operating conditions of typical adhesive spray machines, the diameter of the sprayed adhesive fiber can range from the size of the aperture to as little as about 0.002 inch depending on operating conditions. Depending on the end use and final bond strength desired, the adhesive can be used at application amounts that range from about 5 to as much as 40 $g\text{-}m^{-2}$, preferably 15 to 30 $g\text{-}m^{-2}$, and most preferably 10 to 20 $g\text{-}m^{-2}$.

During the attachment of elastic to a substrate in disposable articles of the invention, using the adhesives of the invention, two modes of application are preferred. One mode of operation involves spraying the adhesive upon an elastic in contact with a film, a fabric, such as a tissue, a woven or non-woven web, or other material having adhesion or permeability to the adhesive. Such sprayed-on adhesive can partially or fully cover the elastic and coat or penetrate the permeable tissue, non-woven or woven fiber, to cause the sheet to be embedded in the adhesive and adhered to the substrate such as an absorbent layer, back layer, or film. Alternatively, the adhesives of the invention can be directly applied to the elastic in contact with the back sheet or film and the tissue, woven or non-woven fabric, or other material. The adhesive retains sufficient liquidity that it can penetrate pores or apertures in the fabric to form a mechanical bond. In the manufacture of tissue fluff absorbent cores, the fluff is typically wrapped by tissue. The tissue layer can be wrapped around the fluff and can overlap. Adhesive can then be sprayed on the overlapping portion of tissue outerwrap, can penetrate the wrappings and adhere the tissue to the fluff ensuring that the fluff obtains dimensional stability from adherence to the outer wrap.

In somewhat greater detail, the sprayable, hot melt adhesive compositions of the invention typically comprise an effective amount of a base and an effective amount of a tackifying agent to form an effective adhesive that has the unique property that after spraying and cooling retains sufficient liquidity to penetrate a porous layer.

The composition of the invention is substantially free of a component that can be characterized as a conventional wax in adhesive applications.

EXPERIMENTAL

Compounding of Adhesive Formulations

Adhesive formulations were prepared by melting the materials at 150 C in a 400 ml vessel with a Glas-Col heating mantle and agitating until homogeneous with a Calframo mixer, using a single blade stirrer.

The following materials were melt blended to form a variety of adhesive examples as shown in Table 4 and further shown in FIGS. 1-5.

TABLE 4

Range of materials used in the adhesive blends of the invention

| Component | Wt % | Wt % | Wt % |
|---|---|---|---|
| Ethylene-α-Olefin copolymer Affinity GA 1900 | 30-65 | 40-60 | 40-55 |
| Maleic Anhydride Substituted Polyethylene Epolene C16 | 0.05-30 | 0.1-28 | 5-25 |
| Tackifier Escorez 5637 | 30-65 | 35-60 | 40-55 |

Elastic Attachment Bond Preparation

Each adhesive was sprayed at 19.3 $mg\text{-}in^{-2}$ onto three strands of Invista 940 dtex style 151 LYCRA® elastic thread (available from the Invista Company of Wichita, Kans.) using the method described in Werenicz, U.S. Pat. No. 4,842,666, the method of which is incorporated herein by reference. The adhesives were applied using a Nordson model CWEO5-M2RCXE Spray System (available from the Nordson Corporation of Westlake, Ohio) equipped with a 0.018 inch nozzle set at a height of 25 mm. The Lycra was stretched to 300% elongation using an elastic thread unwinder electronically connected to the laminator drive motor. The laminator used was a May Coating CLS-300 coater laminator (available from Remmele Engineering of St. Paul, Minn.).

The adhesives were all sprayed at a temperature of 150° C. with the air temperature set at 177° C. The web speed was 500 f 50 $ft\text{-}min^{-1}$ with an open-time of approximately 0.25 second and a nip pressure of 30 psi. The adhesive pattern width was held constant for all adhesive at 6.2 mm wide and the air flow was adjusted to obtain the best possible adhesive pattern at this width. Laminations were produced with each adhesive using Clopay DH-203 1.0 mil embossed polyethylene film (available from Clopay Plastic Products Co. of Mason, Ohio) and BBA Style 717D, a 16.9 $g\text{-}m^{-2}$ spunbond nonwoven (available from BBA Fiberweb Americas, Old Hickory, Tenn.). The adhesives were melted and pumped to the Nordson $CF_{200}$ spray head (available from the Nordson Corporation of Westlake, Ohio) using a Acumeter model 3900 10 PG melter Available from Acumeter Laboratories, Saint Paul, Minn.

Elastic Attachment Bond Testing

Six elastic attachment constructs, from the preceding section, were cut approximately 25 mm wide and 400 mm long.

One end was stapled to a cardboard testing board which was marked with three sets of lines. The first line was the zero line, located approximately 15 mm from one edge of the cardboard. The second line was 285 mm from the zero line and the third line was 300 mm from the zero line and approximately 15 mm from the opposite edge of the cardboard from the zero line. The first end of the construct was stapled between the zero line and the edge of the cardboard within the 15 mm. The constructs were then stretched to full extension leaving no gathers in the laminate and marked with a pen at the 300 mm mark. Then the constructs were relaxed until the mark was over the 285 mm line and the other end was stapled to the cardboard within the opposite 15 mm area near the 300 mm line. This left the construct stretched to 95% of full extension.

After a complete set was fastened, a razor blade was used to cut through each of the elastic threads on both ends. One set of cuts was made at the zero line and the other at the 285 mm line. The test board was then placed in a forced air oven set at 100±1° F. for a period of four hours. After four hours the test board was removed and marks were placed on each end of the construct where the elastic threads were no longer gathering the film and fabric. Each mark represents an average of three strands of elastic for each end. The distance between the two marks was then measured and the % creep calculated using the formula:

% Creep=[Initial (285 mm)−Final, mm/Initial (285 mm)]×100.

The above specification, examples and data provide a complete description of the manufacture and use of the composition of the invention. Since many embodiments of the invention can be made without departing from the spirit and scope of the invention, the invention resides in the claims hereinafter appended. As used in this specification and the appended claims, the singular forms "a", "an" and "the" include single and plural referents unless clearly dictated otherwise by specific specification or claim language. Thus, for example, reference to a composition containing "a compound" includes a mixture of two or more compounds.

We claim:

1. A method making a disposable diaper having an elastic band, the method comprising forming an adhesive bond between an elastic band and an imperforate polymer film, the adhesive bond comprising:
   (a) an effective amount of a copolymer comprising ethylene and either hexene or octene having a degree of crystallinity at ambient temperatures of about 5 to 50% based on the copolymer, and density less than about 0.89 g-cm$^{-3}$;
   (b) about 0.05 to about 35 wt % of a polyethylene polymer having randomly oriented substituents comprising an acid anhydride group, wherein the amount of acid anhydride is characterized by a saponification number of about 0.05 to about 15, the polyethylene polymer having a molecular weight $M_n$ of about 2000 to about 10,000; and
   (c) about 30 to 80 wt % of a hydrogenated tackifier,
wherein the hot melt adhesive has a Brookfield viscosity at 150° C. of about 2000 to about 16000 cP and a creep of less than about 70%.

2. The method of claim 1, wherein the hot melt adhesive is applied to a substrate by a technique selected from the group consisting of slot coating, spiral spraying, screen printing, foaming, gravure rolling, and melt blowing.

3. The method of claim 2, wherein the technique is spiral spraying.

4. The method of claim 3, wherein the adhesive is sprayed from a spray head having an aperture of about 0.025 cm to about 0.100 cm.

5. The method of claim 4, wherein the adhesive is sprayed as an adhesive fiber having a diameter of about 0.005 cm to about 0.10 cm.

6. The method of claim 2, wherein the adhesive is sprayed onto an elastic.

7. The method of claim 6, wherein the elastic is further in contact with a layer comprised of a material selected from the group consisting of a fabric, a tissue, a woven fabric, and a non-woven fabric.

8. The method of claim 7, wherein the layer comprises a material that can adhesively bind to the adhesive.

9. The method of claim 7, wherein the layer comprises a material that is permeable to the adhesive.

10. The method of claim 1, wherein the hot melt adhesive is applied in a form selected from the group consisting of a coating, a fiber, a non-woven web, and a film layer.

11. The method of claim 1, wherein the substrate is elastic.

12. The method of claim 1, wherein the hot melt adhesive is applied to the substrate at a temperature to effectively bond the adhesive to the substrate.

13. The method of claim 1, wherein the hot melt adhesive is applied across the entire surface of a substrate.

14. The method of claim 1, wherein the hot melt adhesive is applied across a portion of a substrate.

15. The method of claim 1, wherein the adhesive is applied at a coating weight of about 10 g-m$^{-2}$ to about 40 g-m$^{-2}$.

16. The method of claim 1, wherein the adhesive is applied at a coating weight of about 15 g-m$^{-2}$ to about 30 g-m$^{-2}$.

17. The method of claim 1, wherein the adhesive is applied at a coating weight of about 15 to 20 g-m$^{-2}$.

18. A disposable article, selected from the group consisting of a diaper, an adult incontinent diaper, and a bed pad, the article comprising a polymer film and an elastic wherein the polymer film and elastic are joined by an adhesive layer formed between the elastic and the film, the adhesive layer comprising a hot melt adhesive comprising:
   (a) an effective amount of a copolymer comprising ethylene and either hexene or octene having a degree of crystallinity at ambient temperature of about 5% to 50% based on the weight of the copolymer, and density less than about 0.89 g-cm$^{-3}$;
   (b) about 0.05 to about 35 wt % of a polyethylene polymer having randomly oriented substituents comprising an acid anhydride group, wherein the amount of acid anhydride is characterized by a saponification number of about 0.05 to about 15, the polyethylene polymer having a molecular weight $M_n$ of about 2000 to about 10,000; and
   (c) about 40 to 60 wt % of a hydrogenated tackifier,
wherein the hot melt adhesive has a Brookfield viscosity at 150° C. of about 2000 to about 16000 cP and a creep less than about 70%.

19. The disposable article of claim 18, wherein the copolymer has a melt index of greater than about 800 g-10 min$^{-1}$.

20. The disposable article of claim 18, wherein the copolymer has a molecular weight distribution of less than 4.

21. The disposable article of claim 18, wherein the copolymer has a molecular weight distribution of less than 3.

22. The disposable article of claim 18, wherein the copolymer has a molecular weight distribution between 1.25 and 2.50.

23. The disposable article of claim 18, wherein the copolymer has a degree of crystallinity of about 10 wt % to about 30 wt % based on the weight of the copolymer.

24. The disposable article of claim 18, wherein the copolymer has a degree of crystallinity at ambient temperature of at least about 15 wt % to about 20 wt % based on the weight of the copolymer.

25. The disposable article of claim 18, wherein the copolymer has a density of at least 0.850 g-cm$^{-3}$.

26. The disposable article of claim 18, wherein the copolymer has a density of about 0.860 g-cm$^{-3}$ to about 0.890 g-cm$^{-3}$.

27. The disposable article of claim 18, wherein the copolymer is present at greater than about 30 wt % of the adhesive mixture.

28. The disposable article of claim 18, wherein the copolymer is present at greater than 40 wt % of the adhesive mixture.

29. The disposable article of claim 18, wherein the copolymer is present at greater than 50 wt % of the adhesive mixture.

30. The disposable article of claim 18, wherein the copolymer comprises a blend of a first copolymer and a second copolymer that differ in number average molecular weight by at least 5000 g-mol$^{-1}$.

31. The disposable article of claim 30, wherein the first copolymer and the second copolymer that differ in number average molecular weight by at least 10,000 g-mol$^{-1}$.

32. The disposable article of claim 30, wherein the first copolymer and a second copolymer that differ in number average molecular weight by at least 20,000 g-mol$^{-1}$.

33. The disposable article of claim 18, wherein the copolymer comprises a blend of a first copolymer and a second copolymer that differ in density by at least 0.005 g-cm$^{-3}$.

34. The disposable article of claim 18, wherein the copolymer comprises a blend of a first copolymer and a second copolymer that differ in density by at least 0.010 g-cm$^{-3}$.

35. The disposable article of claim 18, further comprising a polymeric additive.

36. The disposable article of claim 35, wherein the polymeric additive is a diblock copolymer.

37. The disposable article of claim 35, wherein the polymeric additive is a triblock copolymer.

38. The disposable article of claim 35, wherein the polymeric additive is a radial block polymer.

39. The disposable article of claim 36, wherein at least one block of the polymeric additive is comprised of a monomer selected from the group consisting of ethylene, propylene, isoprene, butadiene, hydrogenated butadiene, styrene, butene, and hydrogenated isoprene.

40. The disposable article of claim 39, wherein at least one block of the polymeric additive comprises styrene.

41. The disposable article of claim 18, wherein the substituted polyethylene comprises a maleic anhydride substituted polyethylene.

42. The disposable article of claim 41, wherein the maleic anhydride substituted polyethylene has a saponification number of about 2 to about 10.

43. The disposable article of claim 18, wherein the substituted polyethylene has a density of about 0.900 g-cm$^{-3}$ to about 0.915 g-cm$^{-3}$.

44. The disposable article of claim 18, wherein the substituted polyethylene has a molecular weight of about 3000 g-mol$^{-1}$ to about 10,000 g-mol$^{-1}$.

45. The disposable article of claim 18, wherein the hydrogenated tackifier has a softening point temperature of at least 120° C.

46. The disposable article of claim 45, wherein the hydrogenated tackifier has a softening point temperature of at least 125° C.

47. The disposable article of claim 45, wherein the hydrogenated tackifier has a softening point temperature in the range of 127° C. to 145° C.

48. The disposable article of claim 18, wherein the hydrogenated tackifier is an aromatic modified, cycloaliphatic hydrocarbon resin.

49. The disposable article of claim 18, wherein the hydrogenated tackifier is present in an amount of 45% to 75% by weight of the adhesive.

50. The disposable article claim 49, wherein the hydrogenated tackifier is present in an amount of 50% to 65% by weight of the adhesive.

51. The disposable article of claim 18, wherein the weight ratio of the tackifying resin to the remaining components of the hot melt adhesive is less than about 1:1 and the adhesive softening point is in the range of about 70° C. to 82° C.

52. The disposable article of claim 51, wherein the adhesive softening point is 74° C. to 77° C.

53. The disposable article of claim 18, wherein the adhesive has a Brookfield viscosity at 150° C. of about 5000 cP to about 8000 cP.

54. The disposable article of claim 18, wherein the adhesive has a creep of less than about 30%.

55. The disposable article of claim 18, wherein the article comprises a permeable layer joined with an elastic.

56. The disposable article of claim 18, further comprising a third layer selected from the group consisting of a cellulosic tissue, a woven fabric, a non-woven fabric, a thin sheet, a flexible sheet, a porous sheet, and a wettable sheet-like material.

57. The disposable article of claim 56, wherein the third layer comprises a non-woven fabric having a basis weight of 10 g-yd$^{-2}$ to 25 g-yd$^{-2}$, a dry tensile strength of at least about 800 g-cm$^{-2}$ in the machine direction, and a dry tensile strength of at least about 200 g-cm$^{-2}$ in the cross machine direction.

58. The disposable article of claim 57 wherein the third layer is comprised of a polymer selected from the group consisting of a rayon, a polyester, a polypropylene, and a nylon.

59. The disposable article of claim 18, wherein the polymer film is a flexible sheet-like substrate.

60. The disposable article of claim 18, wherein the polymer film comprises a thermoplastic resin.

61. The disposable article of claim 58, wherein the polymer is selected from the group consisting of polyethylene, polypropylene, ethylene-propylene copolymers, ethylene acrylate copolymers, ethylene vinyl acetate copolymers, polyvinyl chloride polymers, polyvinylidene chloride polymers, polyester polymers, and blends thereof.

62. The disposable article of claim 18, wherein the polymer film has a thickness of about 0.5 mil to about 2.0 mil.

63. The disposable article of claim 18, further comprising an additive.

64. The disposable article of claim 63, wherein the additive is selected from the group consisting of wrapping materials, absorbent materials, deodorants, perfumes, dyes, printed text, printed graphics, decorative appliqués, combinations thereof.

65. The disposable article of claim 64, wherein the additive is an absorbent material.

66. The disposable article of claim 65, wherein the absorbent material is cellulosic.

67. The disposable article of claim 66, wherein the absorbent material comprises a water-insoluble organic anionic polymeric material that is capable of absorbing at least 50% by weight of the starting weight of the anionic polymeric material.

68. The disposable article of claim 18, wherein the elastic is in a form selected from the group consisting of a band, a thread, and a fiber.

69. The disposable article of claim 18, wherein a fluid permeable fabric top sheet is adhered to a film back sheet.

70. The disposable article of claim 18, wherein the adhesive layer is applied in an amount of about 10 g-m$^{-2}$ to about 40 g-m$^{-2}$.

71. The disposable article of claim 18, wherein the adhesive layer is applied in an amount of about 15 g-m$^{-2}$ to about 30 g-m$^{-2}$.

72. The disposable article of claim 18, wherein the adhesive layer is applied in an amount of about 20 g-m$^{-2}$ to about 25 g-m$^{-2}$.

* * * * *